United States Patent
Schmidt et al.

(10) Patent No.: US 6,515,819 B1
(45) Date of Patent: Feb. 4, 2003

(54) ADAPTIVE UPDATE OF SEEK TIME PREDICTION DATA

(75) Inventors: Thorsten Schmidt, Milpitas, CA (US); Tim K. Emami, San Jose, CA (US); Fred Hansen, Newark, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/280,417

(22) Filed: Mar. 29, 1999

(51) Int. Cl.[7] .............................................. G11B 5/596
(52) U.S. Cl. ................. 360/78.04; 360/78.08; 360/78.14
(58) Field of Search ...................... 360/78.01, 78.04, 360/78.06, 78.07, 78.08, 78.14

(56) References Cited

U.S. PATENT DOCUMENTS

| | | | | | |
|---|---|---|---|---|---|
| 5,550,998 A | * | 8/1996 | Willis et al. | ......... | 360/78.09 X |
| 5,570,332 A | * | 10/1996 | Heathe et al. | ....... | 360/78.04 X |
| 5,859,742 A | * | 1/1999 | Takaishi | ............... | 360/77.07 X |

* cited by examiner

Primary Examiner—Andrew L. Sniezek

(57) ABSTRACT

Methods and apparatus for processing a seek request on a disk drive apparatus having a disk drive head is disclosed. The seek request is processed. During the seek request, the disk drive head is traversed across an actual distance. At least one expected seek time associated with the actual distance is obtained from a set of seek time data. One or more measurements are performed on the disk drive apparatus to obtain an update value. At least one expected seek time is then updated such that at least part of the update value is included in the at least one expected seek time.

31 Claims, 13 Drawing Sheets

| | Region | Seek distance (D) | Seek distance parameter ($\delta$) |
|---|---|---|---|
| | 1 | $D_{11} - D_{12}$ | $F_1(D)$ |
| | 2 | $D_{21} - D_{22}$ | $F_2(D)$ |
| | 3 | $D_{31} - D_{32}$ | $F_3(D)$ |
| | 4 | $D_{41} - D_{42}$ | $F_4(D)$ |
| | ⋮ | ⋮ | ⋮ |

| | Region | Seek distance (D) | Seek distance parameter ($\delta$) | |
|---|---|---|---|---|
| 810 | 1 | 0 - 34 *812* | sqrt (D) | 814 |
| 816 | 2 | 35 - 234 *818* | sqrt (D) | 820 |
| 822 | 3 | 235 - 2800 *824* | sqrt (D) | 826 |
| 828 | 4 | 2801 - full stroke *830* | D | 832 |
| | ⋮ | | | |

Fig. 8

| Region | Command | $a_{old}$ | $b_{old}$ |
|---|---|---|---|
| 1 | Read  *912* | *914* $a_{1R}$ | *916* $b_{1R}$ |
| 1 | Write *918* | *920* $a_{1W}$ | *922* $b_{1W}$ |
| 2 | Read | $a_{2R}$ | $b_{2R}$ |
| 2 | Write | $a_{2W}$ | $b_{2W}$ |
| 3 | Read | $a_{3R}$ | $b_{3R}$ |
| 3 | Write | $a_{3W}$ | $b_{3W}$ |
| 4 | Read | $a_{4R}$ | $b_{4R}$ |
| 4 | Write | $a_{4W}$ | $b_{4W}$ |

*Fig. 9*

ADAPTIVE UPDATE OF SEEK TIME PREDICTION DATA

BACKGROUND OF THE INVENTION

1. Field of the Invention

The present invention relates generally to methods and apparatus for use in disk drives for computer systems. More particularly, the present invention relates to methods and apparatus for adaptively updating seek time prediction data.

2. Description of the Related Art

The reduction of the time required to access data in disk drives is crucial to ensure that performance issues associated with a disk drive may be minimized. When performance of a disk drive is not at an acceptable level, customer dissatisfaction regarding the disk drive may be significant, and the time required to access data stored on the disk drive may be compromised. By way of example, when a disk drive experiences a time delay during access of data stored on the disk drive, a customer may perceive the disk drive to be operating in a faulty manner. Therefore, the magnitude of time delays experienced on a disk drive during access of data stored on the disk drive must generally be reduced to acceptable levels.

FIG. 1 is a diagrammatic representation of a disk drive assembly suitable for use in a computer system. A disk drive assembly 102, which may also be known as a head-disk assembly (HDA), includes a platter assembly 104 that is situated on a base plate 103. Platter assembly, as shown, includes a platter 105 and a spindle mechanism 106. Spindle mechanism 106 typically includes a spindle bearing 107 which is coupled to platter 105, or a disk. Data is stored, or otherwise encoded, on the disk 105. The data may be stored on the disk 105 in multiple tracks 108, each of which includes encoded position information. That is, each track 108 contains track numbers and patterns to determine fractional positions which relate to the location of a disk drive, or read/write, head 120 with respect to the disk 105.

Disk drive assembly 102 also includes an actuator assembly 114. Actuator assembly 114 includes an actuator 118 which supports disk drive head 120. Actuator assembly 114 is arranged to move disk drive head 120 to different positions over the disk 105 such that data may be retrieved from or stored to different data-carrying sectors of the disk 105. In general, when disk drive head 120 is to be moved, torque is generated to pivot or otherwise move actuator assembly 114 by a motor assembly 122. Motor assembly 122 is generally mechanically coupled to actuator assembly 114 through an actuator bearing 124.

Actuator motor assembly 122 often includes a coil structure and a magnetic field which surrounds the coil structure, as will be appreciated by those skilled in the art. In other words, actuator motor assembly 122 typically includes a voice coil motor (VCM). By passing current through the coil structure in a particular direction and for a specified length of time, actuator assembly 114 may be moved, e.g., pivoted, such that disk drive head 120 is positioned over a specific portion of the disk 105. The pivoting of actuator assembly 114 to position the disk drive head 120 in a desired position is generally known as a "seek." The time to perform each seek is typically known as "seek time." A spindle bearing 107, which is coupled to a spindle motor (not shown), allows the disk 105 to rotate with respect to base plate 103. The time required to rotate the disk 105 to perform a particular data access may be termed "rotation time." The rotation time is equal to the time required to rotate from a current position to a desired position on the disk 105. Thus, the rotation time may be as great as the time required for one revolution of the disk 105. Generally, the total time to access a particular block of data stored on the disk is approximately equal to the sum of the seek time, the rotation time, and the time required to read or write the data.

When multiple seek commands are received, the order in which the commands are processed may be determined by the total time required to access each of the corresponding data blocks. As shown, the disk may rotate in a direction indicated by arrow 126. In addition, a first data block 128, a second data block 130, and a third data block 132 are illustrated. As shown in FIG. 1, the first data block 128 has rotated past the disk drive head 120. Thus, if the first data block 128 is accessed first, a delay approximately equal to the rotation time is imposed. As a result, it is typically preferable to read the data block that is closest to the disk drive head 120 and which has not rotated past the disk drive head 120. By way of example, it may be preferable to access the second data block 130 since it is closest to the disk drive head 120 in the rotation path of the disk 105. Thus, the total time required to access each data block stored on the disk 105 is dependent upon the location of the data being accessed.

As described above, the order in which the seek commands are selected and executed is preferably determined, at least in part, by the total time required to access each data block. The rotation time is dependent upon the revolutions per minute (RPM) of the disk 105 and may therefore be easily calculated. However, the seek time is dependent upon the distance between the data being accessed and the disk drive head 120. Therefore, it would be beneficial if these seek times could be accurately predicted.

Expected seek times associated with various seek commands may be tracked through the use of a seek time table. As shown in FIG. 2, an exemplary, conventional seek time table is shown. The seek time table includes a plurality of entries 202. Each one of the plurality of entries 202 includes a distance 204 and a seek time 206 that may be required to access data located at the distance from the disk drive head. Typically such a table is static and maintained for multiple disk drives rather than one disk drive. However, disk drives often have varying operating characteristics (e.g., seek times). Moreover, each individual disk drive may operate in a different manner depending upon the operating environment (e.g., temperature, voltage) of the disk drive. As a result, the seek time table may be inaccurate under a variety of circumstances. Accordingly, the total time required to access each data block may be greater than desired.

Inaccuracies associated with the seek time table may have a negative effect on the total time required to access one or more data blocks. By way of example, the seek time table may be presented in the form of a "seek time curve" such as that illustrated in FIG. 3. Seek times 302 are plotted along the y-axis while distances 304 associated with the seek times are plotted along the x-axis. As shown in FIG. 3, the slope of "seek time curve" 306 is highest when the disk drive head must traverse short distances. Since misprediction of seek times may result in rotation of a selected data block past the disk drive head 120, this may result in an unnecessary delay equal to the rotation time as the data block again rotates toward the disk drive head 120. As a result, the cost of error is high, particularly for these short distances. Accordingly, it would be beneficial if seek times could be accurately predicted for various distances, disk drives, and operating environments.

SUMMARY OF THE INVENTION

The invention relates to methods and apparatus for adaptively updating a set of seek time data for use in a disk drive apparatus. In accordance with one embodiment of the invention, the disk drive apparatus includes a disk drive head and the set of seek time data includes a plurality of data points. Each of the plurality of data points is defined-by a distance and an expected seek time during which the disk drive head may be traversed across the distance.

According to one aspect of the invention, methods and apparatus for processing a seek request on a disk drive apparatus having a disk drive head are provided. The seek request is processed during which the disk drive head is traversed across an actual distance. At least one expected seek time associated with the actual distance is obtained from a set of seek time data. One or more measurements are performed on the disk drive apparatus to obtain an update value. At least one expected seek time are then updated such that at least part of the update value is included in the at least one expected seek time. The expected seek time may be in the form of shape parameters associated with a formula equivalent to the expected seek time.

According to another aspect of the invention, methods and apparatus for processing a seek request on a disk drive apparatus having a disk drive head are provided. During the seek request, the disk drive head is traversed across an actual distance and is performed in an actual seek time. An expected seek time associated with the actual distance is then obtained. A difference between the expected seek time and the actual seek time is ascertained. At least one of a plurality of seek times stored in a set of seek time data is then updated such that at least part of the difference between the expected seek time and the actual seek time is included in the at least one of the plurality of seek times.

According to another aspect of the invention, the difference between the expected seek time and the actual seek time is distributed between a lower boundary point and an upper boundary point within the set of seek time data. The difference may be distributed evenly between the lower boundary point and the upper boundary point. Alternatively, the difference may be distributed according to a specified method.

According to one embodiment, the lower boundary point seek time may be modified by a first update time to create the modified lower boundary point seek time. By way of example, the first update time may be a first fraction of the difference between the expected seek time and the actual seek time. According to one embodiment, the first fraction is proportional to a difference between the upper boundary point distance and the actual distance.

Similarly, the upper boundary point seek time may be modified by a second update time to create the modified upper boundary point seek time. By way of example, the second update time may be a second fraction of the difference between the expected seek time and the actual seek time. According to one embodiment, the second fraction is proportional to a difference between the actual distance and the lower boundary point distance.

According to yet another aspect of the invention, a filter is applied to the modified lower boundary point seek time and the modified upper boundary point seek time. By way of example, when the expected seek time is less than or equal to the actual seek time, it may be preferable to provide minimal filtering. As yet another example, when the expected seek time is greater than the actual seek time, it may be preferable to provide more filtering. In this manner, expected seek times are maximized to minimize the cost of misprediction.

According to another aspect of the invention, a set of seek time data associated with expected seek times for a disk drive apparatus is updated. A plurality of regions are created, each of the regions corresponding to a range of possible seek distances. The set of seek time data includes a set of shape parameters for each of the regions. Each set of shape parameters is associated with an equation that produces an expected seek time. A seek request is performed during which the disk drive head is traversed across an actual distance. One or more measurements are then performed on the disk drive apparatus to obtain an update value. The one of the plurality of regions associated with the actual seek distance is determined. The set of shape parameters for the appropriate region is then updated such that at least part of the update value is applied to the set of shape parameters.

These and other advantages of the present invention will become apparent upon reading the following detailed descriptions and studying the various figures of the drawings.

BRIEF DESCRIPTION OF THE DRAWINGS

The present invention will be readily understood by the following detailed description in conjunction with the accompanying drawings, wherein like reference numerals designate like structural elements, and in which:

FIG. 8 is a diagram illustrating a table in which seek distance parameters ($\delta$) are associated with possible seek distances according to an embodiment of the invention.

FIG. 9 is a table which provides shape parameters for each of the regions and command types according to an embodiment of the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

An invention is described herein that adaptively updates a set of seek time data for use in a disk drive apparatus. In accordance with one embodiment of the invention, the disk drive apparatus includes a disk drive head and the set of seek time data includes a plurality of data points. Each of the plurality of data points is defined by a distance and an expected seek time during which the disk drive head may be positioned, or traversed, across the distance.

Figure 4A:
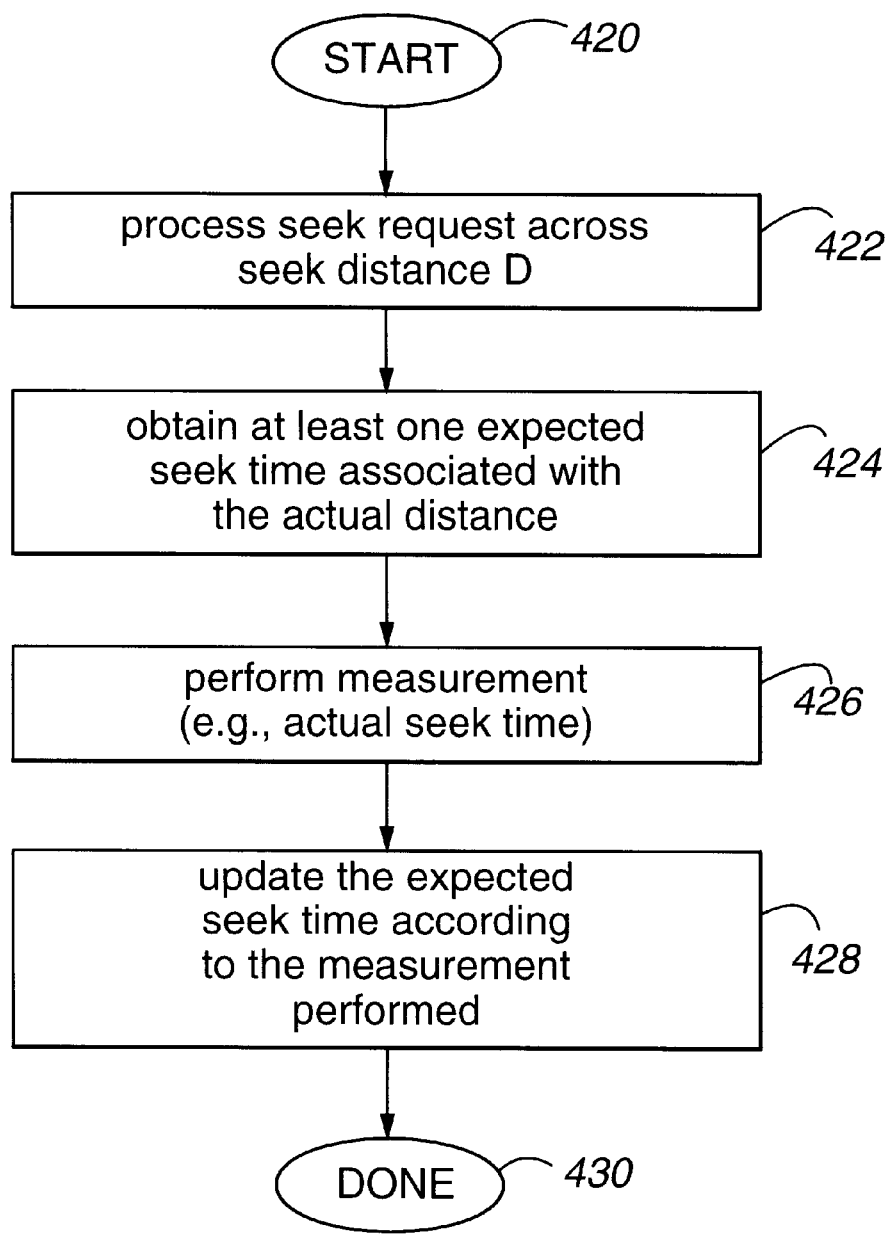
FIG. 4A is a flow diagram illustrating a method for adaptively updating an expected seek time according to an embodiment of the invention.

Referring now to FIG. 4A, a method for adaptively updating an expected seek time according to an embodiment of the invention is presented. The method adaptively updates expected seek times based upon one or more measurements performed on the disk drive. The disk drive head is traversed across an actual seek distance D at step 422. Next, at step 424, at least one expected seek time associated with the actual distance is obtained from a set of seek time data such as a table or equation (e.g., curve) format. By way of example, at least one shape parameter associated with an equation that produces the expected seek time for the actual distance traversed may be obtained. Thus, the shape parameter is associated with the actual distance traversed. One or more measurements are then performed on the disk drive apparatus to obtain an update value at step 426. By way of example, the measurement may include actual seek time, coil resistance, magnetic strength, temperature, or other disk drive parameters. The expected seek time is then updated according to the measurement performed such that at least part of the update value is included in the expected seek time at step 428. By way of example, where the set of seek time data is stored in the form of an equation (e.g., curve), each shape parameter may be updated. The process ends at step 430.

The set of seek time data may be stored in a variety of formats. In the following description, the set of seek time data is described as being stored in a seek time table that is arranged to associate distances with expected seek times. However, the set of seek time data may be stored in other formats, including, but not limited to, an equation format or curve format.

Figure 4B:
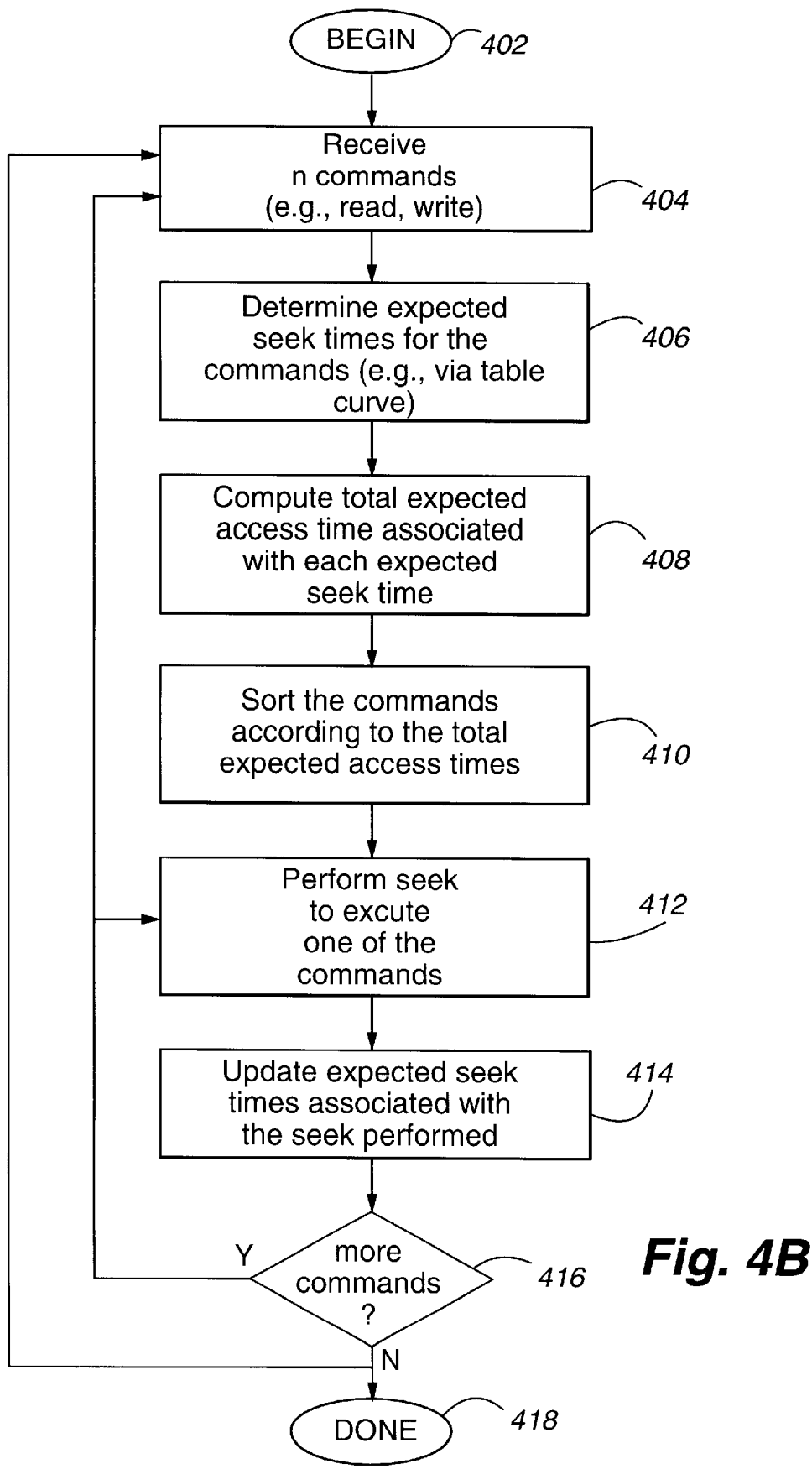
FIG. 4B is a flow diagram illustrating a method for adaptively updating a seek time table according to one embodiment of the invention.

Referring now to FIG. 4B, a method for adaptively updating a seek time table according to one embodiment of the invention is illustrated. The method begins at step 402. Next, at step 404, a set of n commands are received. By way of example, each of the commands may comprise a read or a write command. Next, at step 406, total expected seek times are determined for at least a subset of the n commands. By way of example, the expected seek times may be obtained from a seek time table, curve, or other suitable source. Next, at step 408, a total expected data access time associated with each expected seek time may be computed. As described above, the total expected data access time may be equal to the sum of the expected seek time, the expected rotation time, and the time required to perform a data access (e.g., read or write the data). The set of all received commands may then be sorted according to the total expected access times at step 410.

Once the set of n commands are sorted, a seek may then be performed at step 412 to execute one of the commands. By way of example, each seek may be performed for the next command in a queue. As yet another example, seeks may be performed according to an algorithm determined in part according to the total expected data access times. Thus, seeks may be performed to optimize seek times for a sequence of commands rather than for an individual command.

In one embodiment, a seek request may be received on servo code associated with the disk drive apparatus. More particularly, the seek request may be received in interface code and sent on from the interface code to the servo code. When the seek request is processed, the disk drive head is moved to traverse an actual distance. In addition, the seek is performed in an actual seek time. An expected seek time associated with this actual distance may be obtained from the set of seek time data or extrapolated from adjacent data points.

One or more expected seek times associated with the seek performed in step 412 are then updated at step 414. By way of example, these expected seek times may be updated in a seek time table. The updating of a seek time table will be described in more detail below with reference to FIG. 5, FIG. 6, and FIG. 7. If it is determined at step 416 that there are more commands to execute, further seeks may be performed at step 412. Alternatively, more commands may be received at step 404 even if commands remain to be executed. If it is determined at step 416 that there are no more commands to execute, more commands may be received at step 404. The process completes at step 418.

Figure 5:
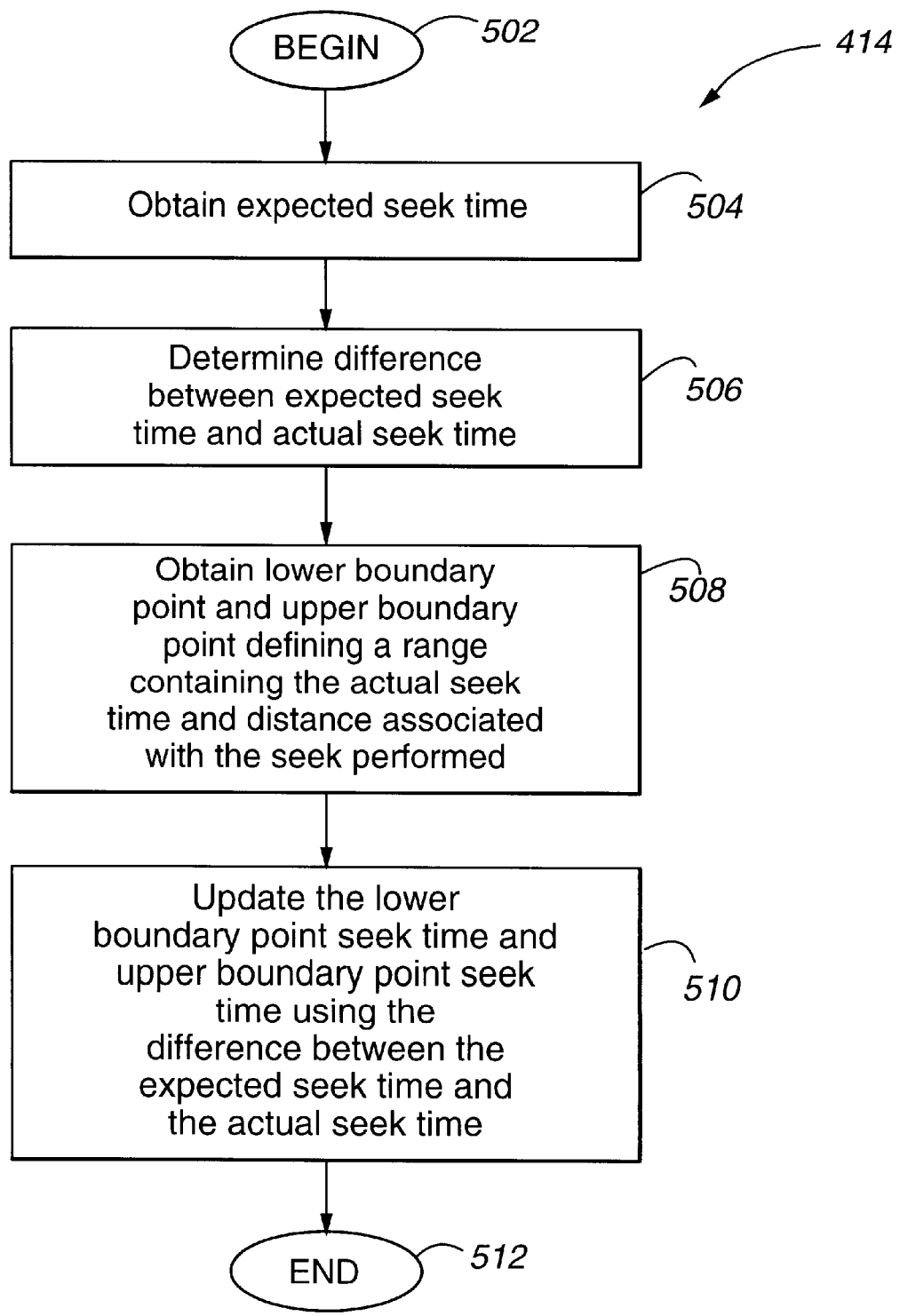
FIG. 5 is a flow diagram illustrating a method for processing a seek request and performing a seek time table update as shown in step 414 of FIG. 4B according to one embodiment of the invention.

Referring next to FIG. 5, a method for performing a seek time table update, as shown in step 414 of FIG. 4B, according to one embodiment of the invention is illustrated. The method adaptively updates expected seek times based upon one or more measurements performed on the disk drive. These measurements may include actual seek time, coil resistance, magnetic strength, temperature, or other disk drive parameters. Moreover, the method shown in FIG. 5 may update the expected seek times using a variety of techniques.

As shown in FIG. 5, one method for performing a seek time table update is based upon measurements of actual seek time and estimations of expected seek time. The method begins at step 502. Next, an expected seek time associated with the actual distance may be obtained from the set of seek time data at step 504. An update procedure may then be applied at step 506 using one or more measurements to obtain an update value. By way of example, in one embodiment, the measurement may be actual seek time. Thus, a difference between the expected seek time and the actual seek time may be ascertained.

Since the difference between the expected seek time and the actual seek time may be the result of noise or irregular conditions, it may be desirable to distribute the difference between multiple points in the set of seek time data. Moreover, the set of seek time data may not contain a data point defined by the actual distance and the expected seek time. Thus, boundary points stored within the seek time data that are closest to the data point may be obtained and updated according to this difference. As a result, a lower boundary point and an upper boundary point defining a range containing the actual distance and the expected seek time associated with the seek performed are obtained from the set of seek time data at step 508. The lower boundary point is defined by a lower boundary point seek time and a lower boundary point distance. Similarly, the upper boundary point is defined by an upper boundary point seek time and an upper boundary point distance. If the data point defined by the actual distance and the expected seek time is, in fact, stored within the set of seek time data, this data point may be obtained as a lower or upper boundary point.

At step 510, selected expected seek times are updated using the update value associated with the one or more measurements performed. By way of example, the seek times associated with the lower boundary point and the upper boundary point may be updated using the difference between the expected seek time and the actual seek time, as will be discussed below with reference to FIG. 6 and FIG. 7. In other words, the lower boundary point seek time and the upper boundary point seek times are updated to create a modified lower boundary point seek time and a modified upper boundary point seek time. However, it may be desirable to modify only one boundary point seek time rather than both boundary point seek times since the actual boundary point, representing the actual distance and the expected seek time, may be approximately equal to one of the lower or upper boundary points. As a result, at least one of the modified lower and upper boundary point seek times may be updated to reflect at least part of the difference between the expected seek time and the actual seek time. The method ends at step 512.

Figure 1:
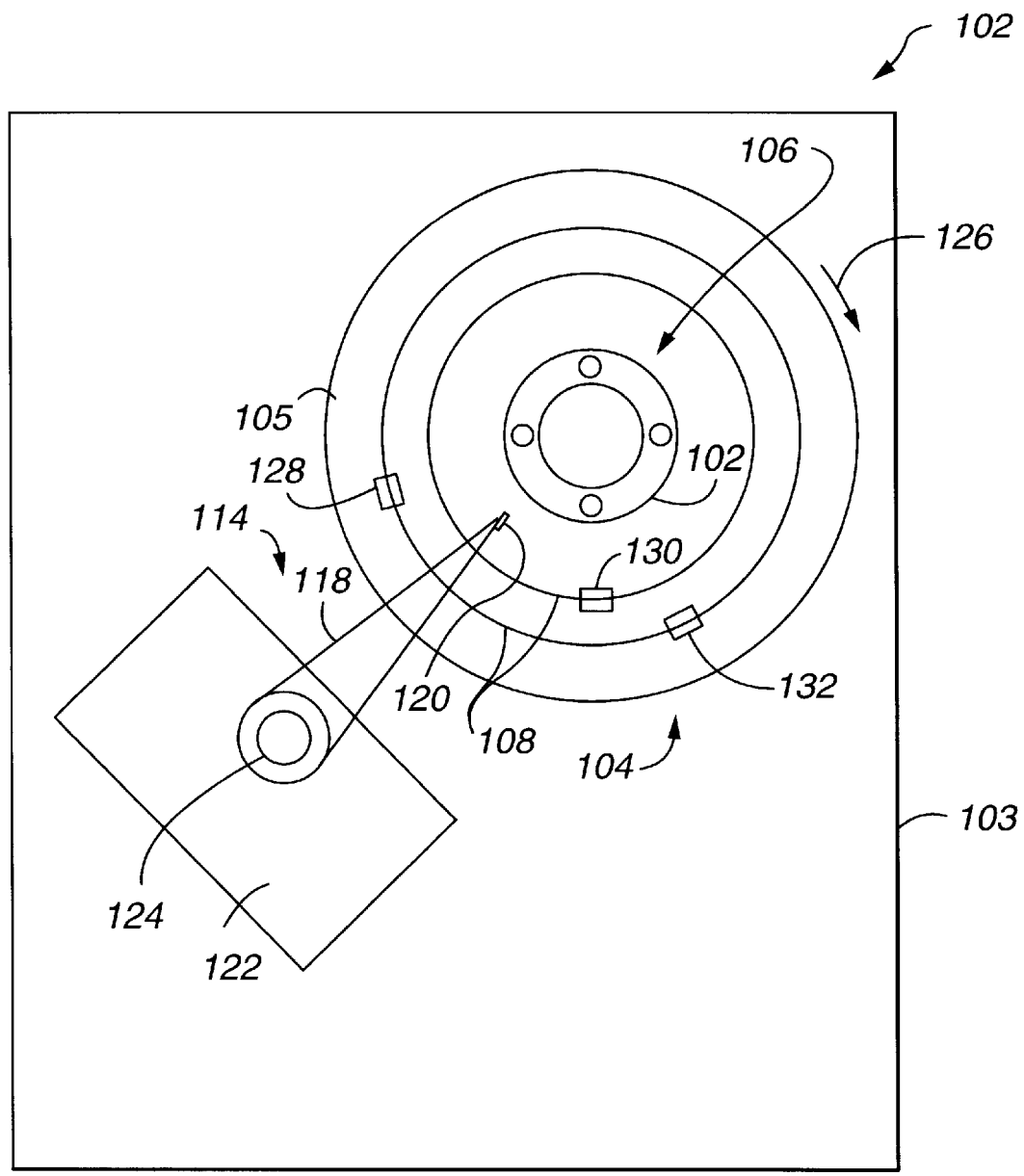
FIG. 1 is a diagrammatic representation of a disk drive assembly suitable for use in a computer system.
Figure 2:
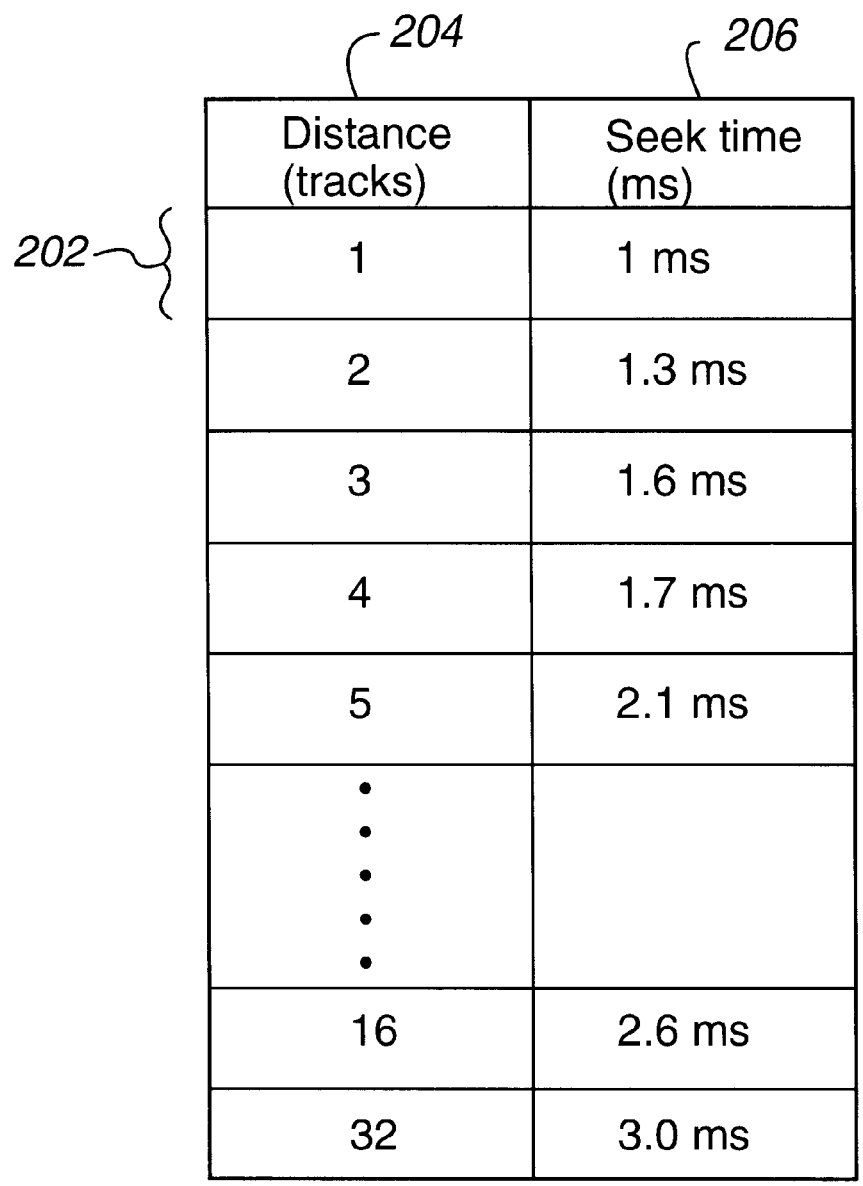
FIG. 2 is a diagram illustrating an exemplary seek time table.
Figure 3:
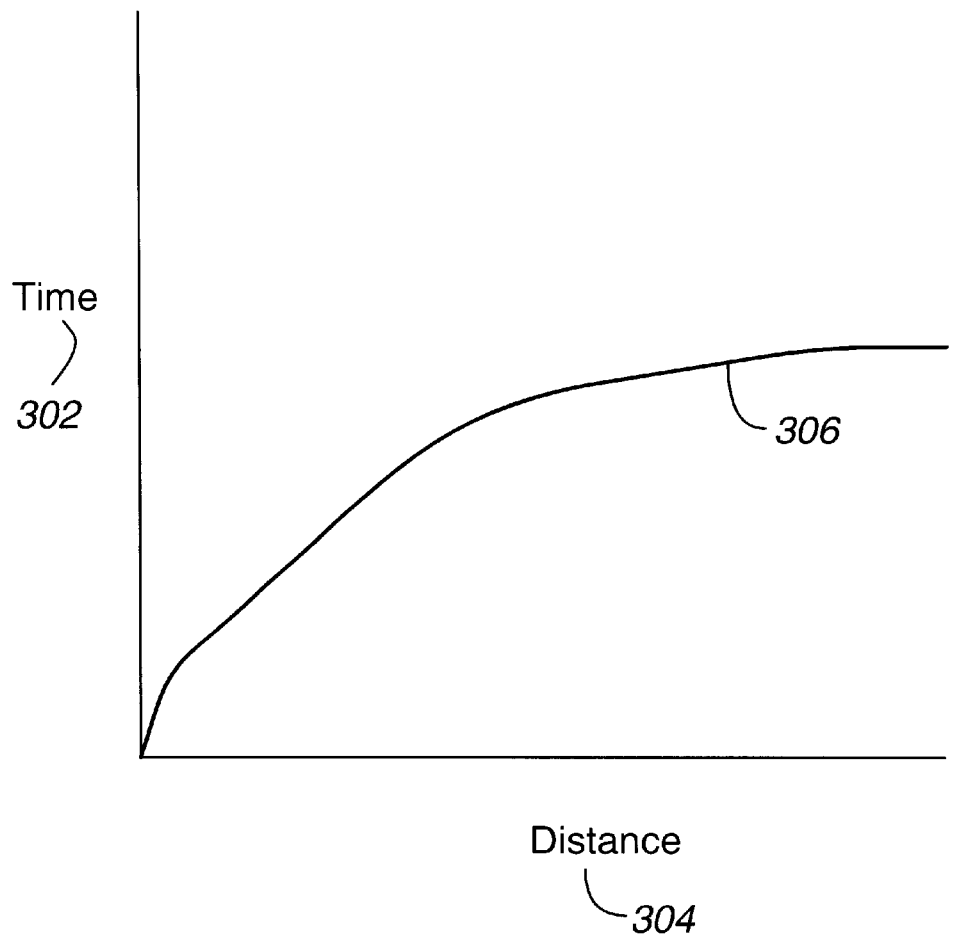
FIG. 3 is a graph illustrating an exemplary seek time curve representing the seek time table shown in FIG. 2.
Figure 6:
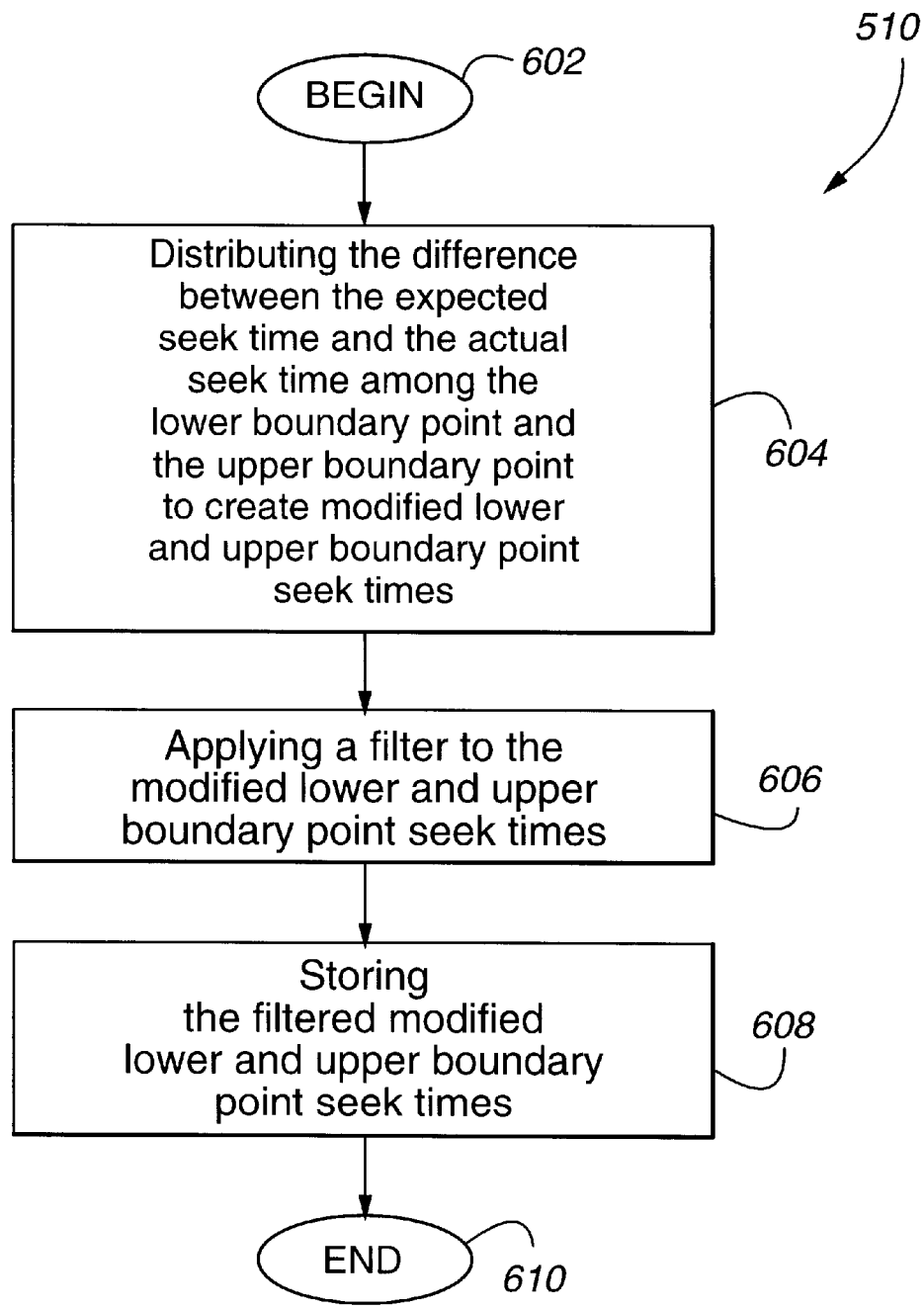
FIG. 6 is a flow diagram illustrating a method for updating the lower boundary point seek time and the upper boundary point seek time shown in step 510 of FIG. 5 according to one embodiment of the invention.

Referring next to FIG. 6, a method for updating the lower boundary point seek time and the upper boundary point seek time shown in step 510 of FIG. 5 according to one embodiment of the invention is illustrated. The method begins at step 602. The difference between the expected seek time and the actual seek time is distributed between the lower boundary point and the upper boundary point to create modified lower and upper boundary point seek times at step 604. A filter such as a low pass filter may then be applied to the modified lower and upper boundary point seek times at step 606 to create updated lower and upper boundary point seek times. The updated lower and upper boundary point seek times may then be stored in the set of seek time data with the lower and upper boundary point distances, respectively, at step 608. By way of example, the filtered seek times may be stored in a seek time table such as that illustrated in FIG. 2. The method ends at step 610.

Figure 7:
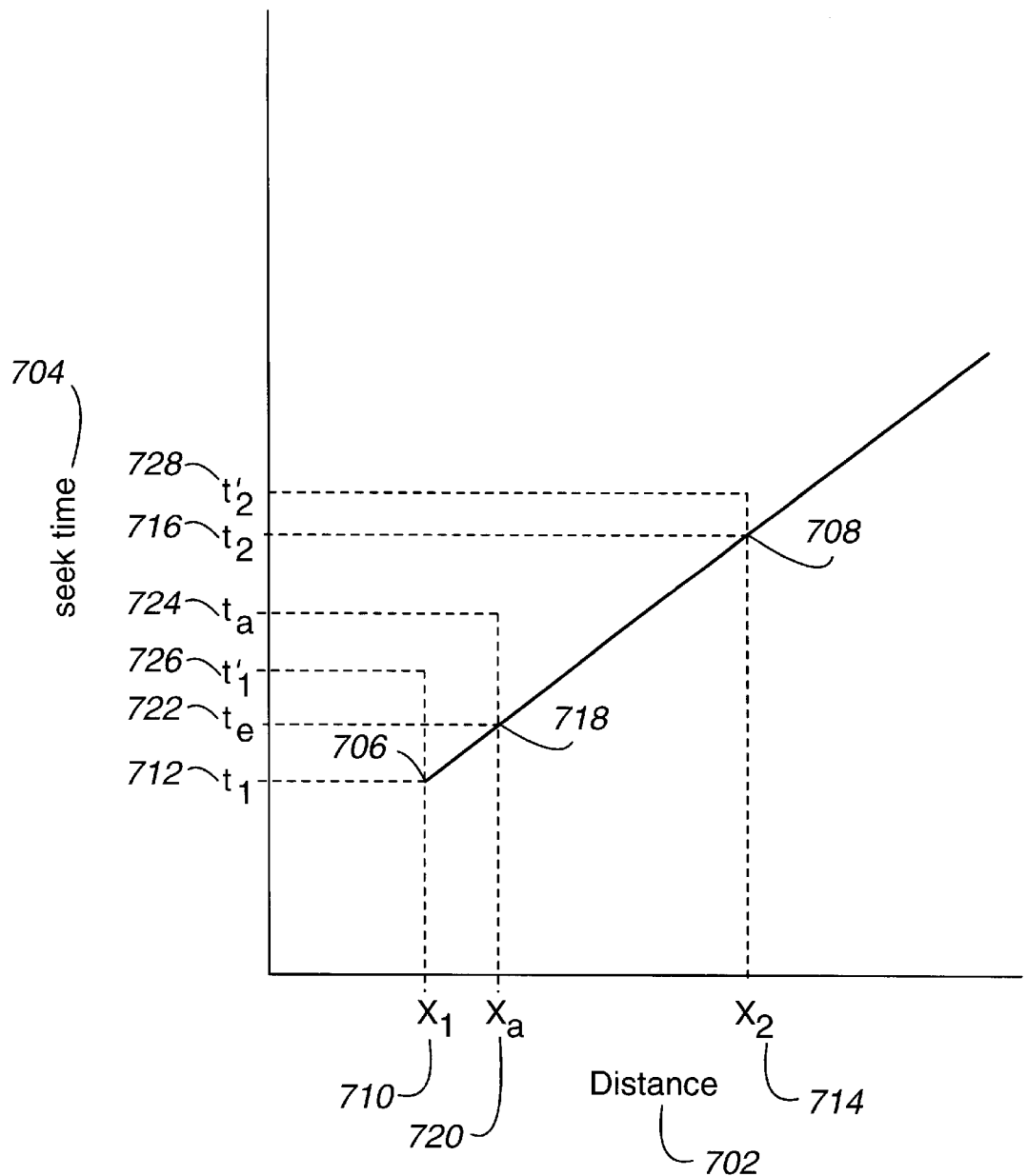
FIG. 7 is an exemplary graph illustrating a set of seek time data that may be updated through application of the present invention.

Referring now to FIG. 7, an exemplary graph illustrating a set of seek time data is presented. As shown, distances 702 are shown along the x-axis while associated seek times 704 are shown along the y-axis. The set of seek time data includes a lower boundary point 706 and an upper boundary point 708. The lower boundary point is defined by a lower boundary point distance 710 and a lower boundary point seek time 712. Similarly, the upper boundary point is defined by an upper boundary point distance 714 and an upper boundary point seek time 716. The lower boundary point 706 and the upper boundary point 708 defines a range containing an actual boundary point 718 which represents the actual distance 720 and the expected seek time 722. In addition, an actual seek time 724 during which the disk drive head is traversed across the actual distance 720 is shown. Moreover, an updated lower boundary point seek time 726 and an updated upper boundary point seek time 728 after application of the present invention are illustrated.

As described with respect to step 604 of FIG. 6, the difference between the expected seek time and the actual seek time is distributed between the lower boundary point and the upper boundary point to create modified lower and upper boundary point seek times. The difference may be distributed evenly or according to a specified method. One method for distributing the difference between the expected seek time and the actual seek time between the lower boundary point and the upper boundary point may be performed through the use of the following equations:

$$\text{raw } t_1 = t_1 + (t_a - t_e)^*[(x_2 - x_a)/(x_2 - x_1)] \quad (1)$$

$$\text{raw } t_2 = t_2 + (t_a - t_e)^*[(x_a - x_1)/(x_2 - x_1)], \quad (2)$$

where raw $t_1$=modified lower boundary point seek time;

raw $t_2$=modified upper boundary point seek time;

$t_1$=lower boundary point seek time;

$t_2$=upper boundary point seek time;

$t_a$=actual seek time;

$t_e$=expected seek time;

$x_1$=lower boundary point distance;

$x_2$=upper boundary point distance; and $x_a$=actual distance.

The lower boundary point seek time is modified by a first update time to create the modified lower boundary point seek time. By way of example, the first update time may be added to or subtracted from the lower boundary point seek time. The first update time is a first fraction of the difference between the expected seek time and the actual seek time. The first fraction is proportional to a first distance between the upper boundary point distance and the actual distance associated with the seek performed. As shown in Equation 1, the numerator of the first fraction is the first distance while the denominator of the first fraction is the difference between the upper boundary point distance and the lower boundary point distance. Therefore, the lower boundary point seek time is updated by a ratio of the difference between the expected seek time and the actual seek time proportional to a distance between the upper boundary point distance and the actual distance associated with the seek performed.

Similarly, the upper boundary point seek time is modified by a second update time to create the modified upper boundary point seek time. By way of example, the second update time may be added to or subtracted from the upper boundary point seek time. The second update time is a second fraction of the difference between the expected seek time and the actual seek time. The second fraction is proportional to a second distance between the actual distance associated with the seek performed and the lower boundary point distance. As shown in Equation 2, the numerator of the second fraction is the second distance while the denominator of the second fraction is the difference between the upper boundary point distance and the lower boundary point distance. Therefore, the upper boundary point seek time is updated by a ratio of the difference between the expected seek time and the actual seek time proportional to a distance between the actual distance and the lower boundary point distance.

Since the difference between the expected seek time and the actual seek time is distributed between the lower boundary point seek time and the upper boundary point seek time, the sum of the first fraction and the second fraction may equal one. Thus, the first fraction and the second fraction may each have a value between 0 and 1, inclusive. By way of example, when the lower boundary point is the data point defined by the actual distance across which the disk drive head has been positioned and the expected seek time, the first fraction is equal to one and the second fraction is equal to zero. As another example, when the upper boundary point is the data point defined by the actual distance across which the disk drive head has been traversed and the expected seek time, the first fraction is equal to zero and the second fraction is equal to one.

As described above, the difference between the expected seek time and the actual seek time is distributed between the upper and lower boundary point seek times to create modified lower and upper boundary point seek times. However, the difference between the expected seek time and the actual seek time may be due to noise in the system. Thus, it may not be desirable to distribute this entire difference to the lower and upper boundary point seek times. One method for compensating for irregularities in the disk drive system is to apply a filter such as a low pass filter, as previously mentioned.

One method for applying a filter to modified expected seek times such as the modified lower and upper boundary point seek times, shown in step 606 of FIG. 6, may be performed through the application of the following equations:

$$t_1' = \text{raw } t_1(1-\text{pole}) + \text{pole}*t_1 \quad (3)$$

$$t_2' = \text{raw } t_2(1-\text{pole}) + \text{pole}*t_2, \quad (4)$$

where
$t_1'$=updated lower boundary point seek time;
$t_2'$=updated upper boundary point seek time;
raw $t_1$=modified lower boundary point seek time;
raw $t_2$=modified upper boundary point seek time;
$t_1$=lower boundary point seek time;
$t_2$=upper boundary point seek time; and
pole=filtering constant.

As shown above in Equation 3, a pole value is applied to the lower boundary point seek time to obtain a filtered lower boundary point seek time. A difference between unity and the pole value is then applied to the modified lower boundary point seek time to obtain a filtered modified lower boundary point seek time. The filtered lower boundary point seek time and the filtered modified lower boundary point seek time are then summed to obtain an updated lower boundary point seek time.

Similarly, as shown in Equation 4, the pole value is applied to the upper boundary point seek time to obtain a filtered upper boundary point seek time. The difference between unity and the pole value is then applied to the modified upper boundary point seek time to obtain a filtered modified upper boundary point seek time. The filtered upper boundary point seek time and the filtered modified upper boundary point seek time are then summed to obtain an updated upper boundary point seek time.

If the total expected data access time or expected seek time is inaccurately predicted, a seek command may be performed after the data block has rotated past so the head of the disk drive. As a result, this inaccuracy may result in a delay that is approximately equal to the rotation time. To avoid this delay, it is preferable to overestimate the expected seek times. In other words, it is assumed that the expected seek times are longer and the disk drive is slower than as reflected by the unmodified expected seek times. In this manner, the cost of misprediction of seek times is minimized. By way of example, when the expected seek time is greater than the actual seek time, it may be preferable to provide more filtering. As yet another example, when the expected seek time is less than or equal to the actual seek time, it may be preferable to provide less filtering.

As shown in Equations 3 and 4, greater filtering may be provided through the application of a larger pole value (e.g., a pole value equal to one). By way of example, when the pole is closer to one, the updated seek times are essentially equal to the original unmodified boundary point seek times. As yet another example, when the pole is closer to zero, the updated seek times are equal to the modified boundary point seek times. Thus, a larger pole provides greater filtering.

The pole value may be a fraction between zero and one, inclusive. As described above, it may be preferable to provide less filtering when the expected seek time is less than the actual seek time and greater filtering when the expected seek time is greater than the actual seek time. Thus, the pole value applied may be a first pole when the expected seek time is less than the actual seek time and may be a second pole when the expected seek time is greater than the actual seek time. More particularly, the first pole may be less than the second pole. By way of example, the first pole may be between approximately 0.2 and approximately 0.4. As yet another example, the second pole may be between approximately 0.8 and approximately 0.95.

As described above, the set of seek time data may be stored in a variety of formats. In another embodiment, the set of seek time data includes shape parameters associated with an equation (e.g., curve) that associates seek distances with expected seek times. The shape parameters may be updated using various functions, measurements, and parameters. In the following example, the shape parameters are updated using an appropriate seek distance parameter as well as the actual seek time. However, other methods for updating the shape parameters may be applied.

FIG. 8 is a diagram illustrating a table in which seek distance parameters ($\delta$) are associated with possible seek distances according to an embodiment of the invention. As shown, a table 802 or other data structure may create a plurality of regions 804, each of which associate a range of possible seek distances 806 with a seek distance parameter 808. Thus, the seek distance parameter 808 may be associated with the actual seek distance traversed. By way of example, the actual seek distance traversed lies within a range of possible seek distances. The seek distance parameter for each of the plurality of regions may be a function of the actual seek distance. By way of example, for a first region 810, a first range of possible seek distances 812 from 0 to 34 tracks, inclusive, is associated with a first seek distance parameter 814, defined as the square root of the actual seek distance. For a second region 816, a second range of possible seek distances 818 from 35 to 234 tracks, inclusive, is associated with a second seek distance parameter 820, similarly defined as the square root of the actual seek distance. A third region 822 associates a third range of possible seek distances 824, tracks 235 to 2800, inclusive, with a third seek distance parameter 826, the square root of the actual seek distance. In addition, a fourth region 828 associates a fourth range of possible seek distances 830, tracks 2801—full stroke (e.g., all tracks across the disk), inclusive, with a fourth seek distance parameter 832, the actual seek distance D. It has been determined that approximately one-third the distance across the disk, the seek distance parameter is approximately equal to D and therefore the shape parameters vary in a linear manner. However, alternate functions as well as constants may be used as seek distance parameters.

The set of seek time data may include a set of shape parameters for each of the regions as shown in FIG. 9. As shown in Equation 5, the shape parameters are associated with an equation that produces an expected seek time.

$$t = a\delta + b, \quad (5)$$

where
t=expected seek time
a=first shape parameter b=second shape parameter
δ=seek distance parameter Each region 902 may further be associated with a command type 904 in addition to a first shape parameter $a_{old}$ 906 and a second shape parameter $b_{old}$ 908. By way of example, the command type 904 may be a read or a write command. More particularly, as shown in FIG. 9, each region 910 may include a first set of shape parameters associated with read seek requests 912. As shown, the first set of shape parameters for the first region may be defined as $a_{1R}$ 914 and $b_{1R}$ 916. Similarly, a second set of shape parameters may be associated with write seek requests 918, where a second set of shape parameters for the first region includes $a_{1w}$ 920 and $b_{1w}$ 922. Although four regions are shown, fewer or greater regions may be created to provide a proper balance between accuracy and efficiency.

Figure 10:
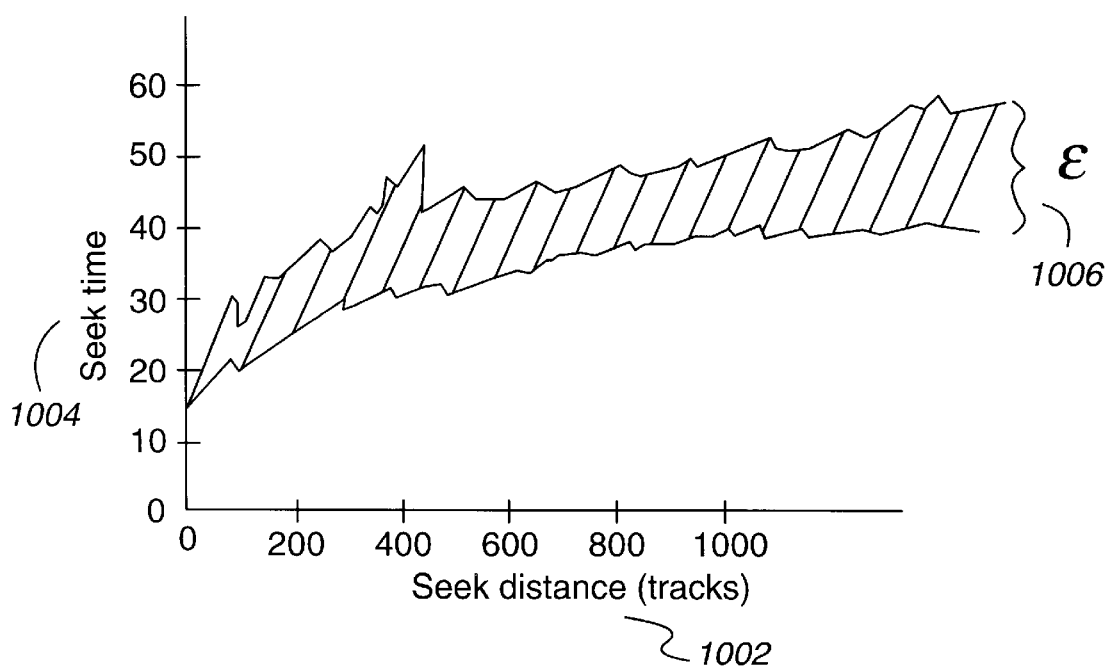
FIG. 10 is a graph illustrating the uncertainty in the expected seek time for a particular seek distance.

As will be described with reference to FIGS. 11 and 12, shape parameters such as those presented in FIG. 9 may be updated using the appropriate seek distance parameter, as provided in FIG. 8, as well as the actual seek time. However, the expected seek time obtained in Equation 5 using these updated shape parameters may be inaccurate due to a variety of factors, including, but not limited to environmental factors, as well as inaccuracies introduced by equipment used to obtain measurements. As shown in FIG. 10, for each possible seek distance 1002, a range of expected seek times 1004 are possible. This range for a particular seek distance 1002 may be defined as the uncertainty $\epsilon$ 1006, or error, in the expected seek time.

Figure 11:
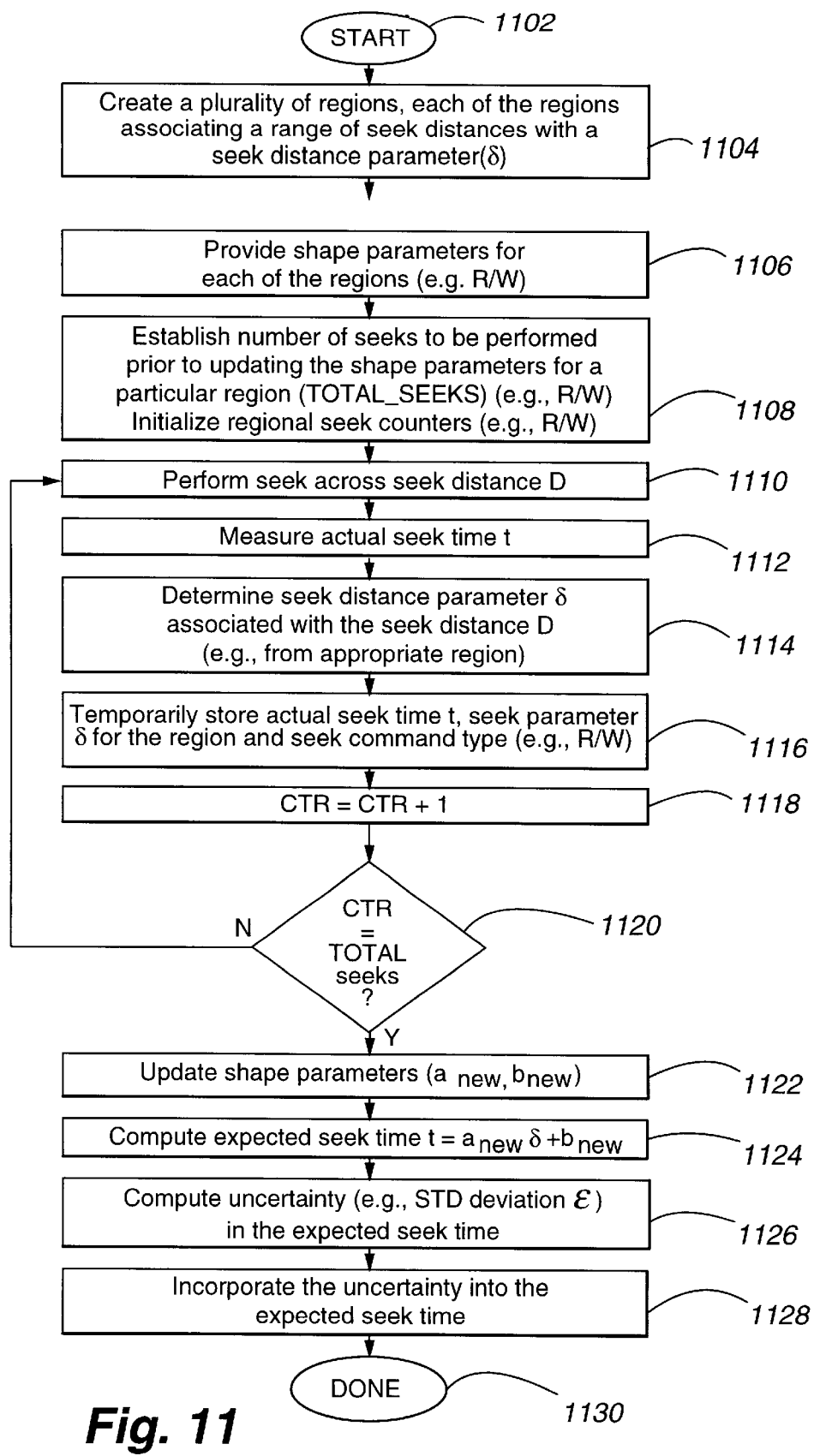
FIG. 11 is a flow diagram illustrating a method for updating a set of seek time data according to another embodiment of the invention.
Figure 12:
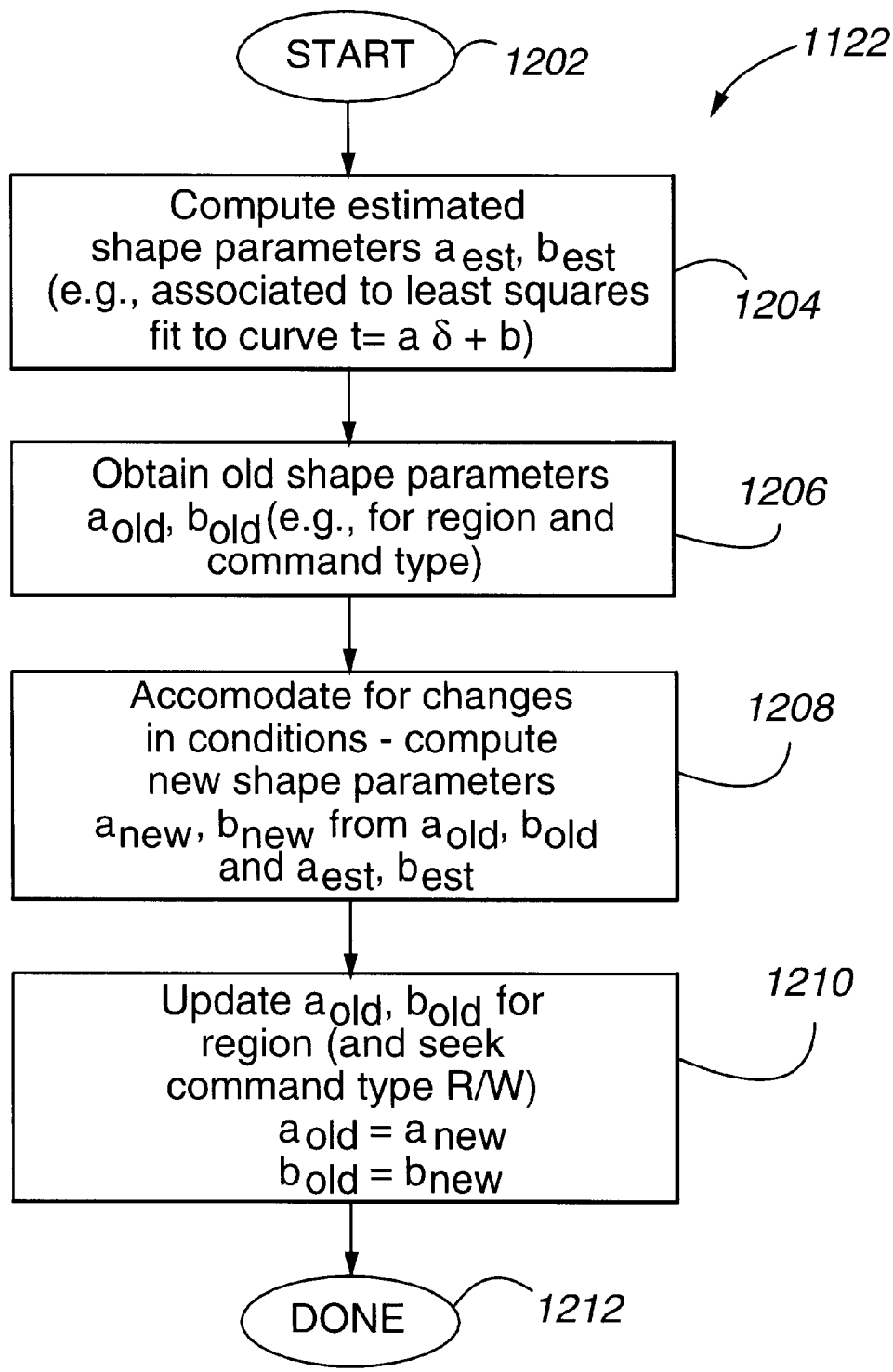
FIG. 12 is a flow diagram illustrating one method for updating shape parameters as shown in step 1122 of FIG. 11.

Referring now to FIG. 11, a method for updating a set of seek time data according to another embodiment of the invention is presented. In this example, the set of seek time data includes shape parameters associated with expected seek times. The process begins at step 1102 and at step 1104, a plurality of regions are created, each of the regions corresponding to a range of possible seek distances. In addition, each range of seek distances may be associated with a seek distance parameter. As described above with reference to FIG. 8, the seek distance parameter may be a function of the actual seek distance. At step 1106, the set of seek time data is provided which includes a set of shape parameters for each of the regions. As shown above with respect to Equation 5, each set of shape parameters is associated with an equation that produces an expected seek time. Moreover, each of the regions may include two sets of shape parameters. Since read commands and write commands require different seek times, a first set of shape parameters may be associated with read seek requests and a second set of shape parameters may be associated with write seek requests.

While the set shape parameters for the appropriate region and command type may be updated after a single seek, it may be preferable to average the actual seek times over a plurality of seeks to increase the accuracy of the expected seek times. Thus, at step 1108, a number of seek requests to be performed prior to updating a set of shape parameters may be established. The number of seek requests may vary with the command type. In other words, a number of read seek requests to be performed prior to updating the first set of shape parameters and a number of write seek requests to be performed prior to updating the second set of shape parameters may be specified. By way of example, 256 seek requests may be performed (e.g., within a particular region and corresponding to a single command type) prior to updating the set of shape parameters. Thus, a seek counter may be initialized for each region and command type within the particular region. A seek request may then be performed until the established number of seek requests is performed for a single command type (e.g., read or write) within one of the regions. At step 1110, a seek request is performed during which the disk drive head is traversed across an actual seek distance. Next, at step 1112, one or more measurements may be performed on the disk drive apparatus to obtain an update value. By way of example, an actual seek time associated with the actual seek distance traversed may be obtained. Next, one of the regions associated with the actual seek distance may be determined. At step 1114, the seek distance parameter associated with the region corresponding to the actual seek distance may be determined.

The set of shape parameters may be updated according to one or more measurements performed, as well as by the seek distance parameter and other factors. In the following example, the actual seek time and the seek distance parameter for each seek performed are applied to the set of shape parameters. However, alternate measurements or parameters may be performed to update the set of shape parameters. The shape parameters may be updated with each seek performed. Alternatively, the actual seek time and the seek distance parameter for the region (and command type) may be temporarily stored at step 1116. By way of example, a linked list, array, or other data structure may be maintained for each command type within each one of the plurality of regions to store the actual seek time and corresponding seek distance parameter. The counter for the appropriate region and command type may be incremented at step 1118. At step 1120, it may be determined whether the established number of seeks has been performed for a single command type (e.g., read or write) within any one of the plurality of regions. This may be accomplished by checking whether one of the counters corresponding to a particular region and command type are equal to the established number of seeks to be performed.

If the desired number of seeks has been performed, the appropriate set of shape parameters (e.g., corresponding to a particular region and command type) are updated at step 1122. By way of example, the set of shape parameters for the one of the plurality of regions may be updated such that at least part of the update value obtained in step 1112 is applied to the set of shape parameters. In addition, the seek distance parameter for the appropriate region (and command type) or equivalent function of the actual seek distance may be applied to the set of shape parameters. One method for updating the set of shape parameters is described in further detail with reference to FIG. 12.

The expected seek time associated with the updated shape parameters may then be determined at step 1124 from Equation 5. In addition, an amount of uncertainty, or error, in the expected seek time may be determined at step 1126. This degree of uncertainty may then be incorporated into the expected seek time at step 1128. The process ends at step 1130.

One method for updating shape parameters as shown in step 1122 of FIG. 11 is described in further detail with reference to FIG. 12. The process begins at step 1202 and at step 1204, estimated shape parameters may be computed by applying the actual seek time and seek distance parameter for the seeks performed. As shown below in Equation 6 and Equation 7, the estimated shape parameters may be computed according to a least squares fit to the curve t =aδ+b.

$$a_{est} = \frac{n\sum t\delta - \sum t \sum \delta}{n\sum \delta^2 - \sum \delta \sum \delta}, \quad (6)$$

where
t=actual seek time
δ=seek distance parameter
n=number of seeks performed within region $$b_{est} = (\Sigma t - a_{est}\Sigma\delta)/n, \quad (7)$$

where
t=actual seek time
δ=seek distance parameter
n=number of seeks performed within region
$a_{est}$=estimated first shape parameter Once estimated shape parameters are calculated, they may used to predict seek times for future seeks. However, various environmental factors such as temperature, voltage and slight movement of the disk drive may affect the estimated seek times. Thus, it may be preferable to limit the impact on the expected seek times due to these changes in conditions. Thus, the estimated shape parameters may be combined with the old shape parameters to obtain new updated shape parameters as shown below in Equations 8 and 9. By way of example, the percentage may be 90 percent, or 0.9. In order to compute these new shape parameters, the old shape parameters (e.g., for the particular region and command type) may be obtained at step 1206 from a table such as that illustrated in FIG. 9. To accommodate for changes in conditions, the new shape parameters $a_{new}$, $b_{new}$ may be computed at step 1208 from the old shape parameters $a_{old}$, $b_{old}$ and the estimated shape parameters $a_{est}$, $b_{est}$ through application of Equations 8 and 9 below.

$$a_{new} = pa_{old} + (1-p)a_{est}, \quad (8)$$

where
$a_{est}$=estimated first shape parameter
$a_{old}$=old first shape parameter
p=percentage $$b_{new} = pb_{old} + (1-p)b_{est}, \quad (9)$$

where
$b_{est}$=estimated second shape parameter
$b_{old}$=old second shape parameter
p=percentage The shape parameters $a_{old}$, $b_{old}$ corresponding to the region and seek command type, as shown in FIG. 9, are then replaced with the updated shape parameter values $a_{new}$, $b_{new}$ at step 1210 and the process ends at step 1212. Since only two parameters are updated, this method is provides an efficient mechanism for updating expected seek times.

The uncertainty, or standard deviation, in the expected seek time computed in step 1126 of FIG. 11 may be computed through the use of an equation such as Equation 10.

$$\varepsilon = \sqrt{\frac{\sum(a_{old}\delta + b_{old} - t_{est})^2}{n}},$$

wherein
$t_{est} = a_{old}\delta + b_{old}$
δ=seek distance parameter
n=number of seeks performed within region
$a_{old}$=old first shape parameter
$b_{old}$=old second shape parameter In order to incorporate this error into the expected seek time at step 1128, a multiple of the standard deviation may be added to the expected seek time. By way of example, the standard deviation may be multiplied by 2 to reflect the uncertainty in the expected seek time. Accordingly, since expected seek times are overestimated, performance is maximized.

The present invention may be used to adaptively update a set of seek time data such as that stored in a seek time table or shape parameters. Through the use of the present invention, the set of seek time data may be updated for a plurality of disk drives. Moreover, the set of seek time data may be updated to include data obtained under variable operating conditions. In this manner, seek times and total expected data access times may be accurately predicted for each data access. As a result, commands may be selected in an optimum order, decreasing the latency of each data access and therefore increasing the efficiency of the disk drive apparatus in which the present invention is implemented.

Although the present invention has been described in terms of implementation with respect to a seek time table and equation format, it should be appreciated that the present invention may be used to adaptively update seek times within a set of seek time data that is stored in any format. Moreover, the present invention may be implemented with respect to any suitable disk drive.

The invention may also be embodied as computer readable code on a computer readable medium. The computer readable medium is substantially any data storage device that can store data which can thereafter be read by a computer system. Examples of the computer readable medium include read-only memory, random-access memory, CD-ROMs, magnetic tape, and optical data storage devices.

What is claimed is:

1. A method for updating a set of seek time data in a disk drive apparatus, the disk drive apparatus having a disk drive head, the set of seek time data including a plurality of data points, each one of the plurality of data points being defined by a distance and a seek time during which the disk drive head may be traversed across the distance, the method comprising:

performing a seek during which the disk drive head is traversed across an actual distance, the seek being performed in an actual seek time;

obtaining an expected seek time associated with the actual distance from the set of seek time data;

ascertaining a difference between the expected seek time and the actual seek time;

obtaining a lower boundary point and an upper boundary point from the set of seek time data which together define a range containing the actual distance associated with the expected seek time, the lower boundary point being defined by a lower boundary point seek time and a lower boundary point distance, the upper boundary point being defined by an upper boundary point seek time and an upper boundary point distance; and updating the lower boundary point seek time and the upper boundary point seek time to create a modified lower boundary point seek time and a modified upper boundary point seek time, wherein at least one of the modified lower and upper boundary point seek times reflects at least part of the difference between the expected seek time and the actual seek time, and wherein updating the lower boundary point seek time and the upper boundary point seek time includes applying a filter to the modified lower boundary point seek time and the modified upper boundary point seek time.

2. The method as recited in claim 1, wherein the modified lower boundary point seek time includes a first fraction of the difference between the expected seek time and the actual seek time and the modified upper boundary point seek time includes a second fraction of the difference between the expected seek time and the actual seek time.

3. The method as recited in claim 2, wherein a sum of the first fraction and the second fraction equals one.

4. The method as recited in claim 2, wherein the first fraction and the second fraction each have a value in a range of between 0 and 1, inclusive.

5. The method as recited in claim 2, wherein the first fraction is equal to one and the second fraction is equal to zero when the lower boundary point is defined by the actual distance across which the disk drive head has been traversed and the expected seek time.

6. The method as recited in claim 2, wherein the first fraction is equal to zero and the second fraction is equal to one when the upper boundary point is defined by the actual distance across which the disk drive head has been traversed and the expected seek time.

7. The method as recited in claim 1, wherein updating the lower boundary point seek time and the upper boundary point seek time includes:
distributing the difference between the expected seek time and the actual seek time evenly between the lower boundary point and the upper boundary point.

8. The method as recited in claim 1, wherein updating the lower boundary point seek time and the upper boundary point seek time includes:
distributing the difference between the expected seek time and the actual seek time between the lower boundary point and the upper boundary point such that the lower boundary point receives a ratio of the difference proportional to a distance between the actual distance and the upper boundary point distance, and the upper boundary point receives a ratio of the difference proportional to a distance between the actual distance and the lower boundary point distance.

9. The method as recited in claim 1, wherein the set of seek time data is stored in a table.

10. The method as recited in claim 1, wherein updating the lower boundary point seek time and the upper boundary point seek time includes:
modifying the lower boundary point seek time by a first update time to create the modified lower boundary point seek time, the first update time being a first fraction of the difference between the expected seek time and the actual seek time, the first fraction being proportional to a first difference between the upper boundary point distance and the actual distance; and
modifying the upper boundary point seek time by a second update time to create the modified upper boundary point seek time, the second update time being a second fraction of the difference between the expected seek time and the actual seek time, the second fraction being proportional to a second difference between the actual distance and the lower boundary point distance.

11. The method as recited in claim 10, wherein modifying the lower boundary point seek time includes:
one of adding the first update time to the lower boundary point seek time and subtracting the first update time from the lower boundary point seek time.

12. The method as recited in claim 10, wherein modifying the upper boundary point seek time includes:
one of adding the second update time to the upper boundary point seek time and subtracting the second update time from the upper boundary point seek time.

13. The method as recited in claim 1, wherein at least one of the lower boundary point and the upper boundary point is defined by the actual distance across which the disk drive head has been traversed and the expected seek time.

14. The method as recited in claim 1, wherein applying the filter includes:
applying a pole value to the lower boundary point seek time to obtain a filtered lower boundary point seek time;
applying the pole value to the upper boundary point seek time to obtain a filtered upper boundary point seek time;
applying a difference between unity and the pole value to the modified lower boundary point seek time to obtain a filtered modified lower boundary point seek time;
applying the difference between unity and the pole value to the modified upper boundary point seek time to obtain a filtered modified upper boundary point seek time;
summing the filtered lower boundary point seek time and the filtered modified lower boundary point seek time to obtain an updated lower boundary point seek time; and
summing the filtered upper boundary point seek time and the filtered modified upper boundary point seek time to obtain an updated upper boundary point seek time.

15. The method as recited in claim 14, further including:
storing the updated lower boundary point seek time with the lower boundary point distance in the set of seek time data; and
storing the updated upper boundary point seek time with the upper boundary point distance in the set of seek time data.

16. The method as recited in claim 14, wherein the pole value applied is a first pole when the expected seek time is less than the actual seek time, and otherwise a second pole.

17. The method as recited in claim 16, wherein the first pole is less than the second pole.

18. The method as recited in claim 16, wherein the first pole is between approximately 0.2 and approximately 0.4.

19. The method as recited in claim 16, wherein the second pole is between approximately 0.8 and approximately 0.95.

20. The method as recited in claim 1, wherein performing the seek further includes:
receiving a seek request on servo code associated with the disk drive apparatus; and
executing the seek request.

21. The method as recited in claim 20, further including:
receiving the seek request in interface code; and
sending the seek request on the servo code.

22. A method for updating a set of seek time data associated with expected seek times for a disk drive apparatus, the disk drive apparatus having a disk drive head, comprising:
creating a plurality of regions, each of the regions associating a range of possible seek distances with a seek distance parameter;
providing the set of seek time data, the set of seek time data including a set of shape parameters for each of the regions, each set of shape parameters being associated with an equation that produces an expected seek time;

establishing a number of seek requests to be performed prior to updating the set of shape parameters for one of the plurality regions, wherein the number of seek requests is at least two;

performing a seek request during which the disk drive head is traversed across an actual seek distance until the number of seek requests is performed for the one of the plurality of regions; and updating the set of shape parameters for the one of the plurality of regions.

23. The method as recited in claim 22, wherein the seek distance parameter for each of the plurality of regions is a function of the actual seek distance.

24. The method as recited in claim 22, wherein each of the set of shape parameters is associated with at least one of a read seek request and a write seek request.

25. The method as recited in claim 22, wherein each one of the plurality of regions includes a first set of shape parameters associated with read seek requests and a second set of shape parameters associated with write seek requests, and establishing the number of seek requests includes:

indicating a number of read seek requests to be preformed prior to updating the first set of shape parameters; and specifying a number of write seek requests to be performed prior to updating the second set of shape parameters.

26. The method as recited in claim 22, wherein performing a seek request is preformed until the number of seek requests is preformed for a command within the one of the plurality of regions os a write command within the one of the plurality of regions.

27. The method as recited in claim 22, further including:

measuring an actual seek time associated with the actual seek distance traversed;

obtaining the seek distance parameter associated with the actual seek distance traversed; and wherein updating the set of shape parameters includes applying the actual seeking time and the seek distance parameter associated with the actual seek distance traversed to the set of shape parameters.

28. The method as recited in claim 22, further including:

determining the expected seek time associated with the updated shape parameter from the equation that produces the expected seek time.

29. The method as recited in claim 28, further including:

ascertaining an amount of uncertainty in the expected seek time.

30. The method as recited in claim 29, further including:

incorporating the amount of uncertainty into the expected seek time.

31. A method for updating a set of seek time data in a disk drive apparatus, the disk drive apparatus having a disk drive head, the set of seek time data including a plurality of data points, each one of the plurality of data points being defined by a distance and a seek time during which the disk drive head may be traversed across the distance, the method comprising:

performing a seek during which the disk drive head is traversed across an actual distance, the seek being performed in an actual seek time;

obtaining an expected seek time associated with the actual distance from the set of seek time data;

ascertaining a difference between the expected seek time and the actual seek time;

obtaining a lower boundary point and an upper boundary point from the set of seek time data which together define a range containing the actual distance associated with the expected seek time, the lower boundary point being defined by a lower boundary point seek time, the upper boundary point being defined by an upper boundary point seek time; and updating at least one of the lower boundary point seek time to create a modified lower boundary point seek time and the upper boundary point seek time to create a modified upper boundary point seek time, wherein at least one of the modified lower boundary point seek time and the modified upper boundary point seek time reflects at least part of the difference between the expected seek time and the actual seek time, and wherein updating at least one of the lower boundary point seek time and the upper boundary point seek time includes applying a filter to at least one of the modified lower boundary point seek time and the modified upper boundary point seek time.

* * * * *